(12) United States Patent
Chen et al.

(10) Patent No.: US 7,697,599 B2
(45) Date of Patent: Apr. 13, 2010

(54) XDSL MODEM AND METHOD FOR STABILIZING CONNECTION OF XDSL MODEM

(75) Inventors: Chun-Lin Chen, Tu-Cheng (TW); Yu-Cheng Lin, Tu-Cheng (TW); Chung-Ho Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 672 days.

(21) Appl. No.: 11/309,794

(22) Filed: Sep. 28, 2006

(65) Prior Publication Data

US 2007/0140472 A1    Jun. 21, 2007

(30) Foreign Application Priority Data

Dec. 16, 2005  (TW) .............................. 94144773 A

(51) Int. Cl.
*H04B 1/38* (2006.01)

(52) U.S. Cl. ..................................... 375/222

(58) Field of Classification Search ................. 375/222, 375/219; 455/556, 557; 379/392.01, 93.01, 379/27; 370/225
See application file for complete search history.

(56) References Cited

U.S. PATENT DOCUMENTS

| 6,252,900 | B1 | 6/2001 | Liu et al. |
| 6,879,645 | B1 * | 4/2005 | Webber et al. ............... 375/317 |
| 7,317,754 | B1 * | 1/2008 | Remy et al. .................. 375/222 |

\* cited by examiner

*Primary Examiner*—Khai Tran
(74) *Attorney, Agent, or Firm*—Wei Te Chung

(57) ABSTRACT

An xDSL (Digital Subscriber Line) modem (160) includes a setting module (168), a detection module (164), and a distinguishing module (166). The setting module pre-sets a threshold value, and adjusts the threshold value according to noise types. The detection-module captures connection parameters of the xDSL modem and the central office (CO) (120), and computes a judging value. The distinguish module distinguishes noise types according to the judging value, and determines whether the connection is maintained or disconnected. A method for stabilizing connection between an xDSL modem and a CO is also provided.

16 Claims, 2 Drawing Sheets

XDSL MODEM AND METHOD FOR STABILIZING CONNECTION OF XDSL MODEM

FIELD OF THE INVENTION

The invention relates to Digital Subscriber Line technology taken as whole and commonly referred to as xDSL, and particularly to an xDSL modem and method for stabilizing an xDSL connection between the xDSL modem and a central office.

DESCRIPTION OF RELATED ART

In an xDSL communication system, when noise is present in DSL lines, cyclical redundancy check (CRC) or header error check (HEC) errors are detected. If the CRC or the HEC errors are detected, packets transmitted on the DSL lines will be dropped. Connection parameters, such as a CRC or HEC error rates, are defined in the xDSL communication system to verify whether the DSL lines are experiencing heavy noises. If the current CRC or HEC error rate is larger than a threshold value, the xDSL communication system tears down the connection and retrains to a central office (CO) to get a better connection parameter. For instance, the xDSL system lowers the transfer rate to reach a target signal noise ratio margin (SNR margin).

Noise in DSL lines can be impulse noise or continuous noise. If the noise is impulse noise, a period of the noise may be very short. However, no matter the noise is impulse noise or continuous noise, the conventional xDSL modem automatically tears down the connection to the CO. Time is not only wasted in re-connection to the CO for dropped calls, but also wasted in lowering the transfer rate.

Therefore, a heretofore unaddressed need exists in the industry to overcome the aforementioned deficiencies and inadequacies.

SUMMARY OF THE INVENTION

An exemplary embodiment of the invention provides an xDSL modem. The xDSL modem is connected to a central office via a public network. The xDSL modem includes a setting module, a detection module, and a distinguishing module. The setting module is used for pre-setting a threshold value, and adjusting the threshold value according to noise types. The detection module is used for capturing connection parameters of the xDSL modem and the central office, and computing a judging value. The distinguishing module is used for distinguishing noise types according to the judging value, and determining whether the connection is maintained or disconnected.

An exemplary embodiment of the invention provides a method for stabilizing connection between an xDSL modem and a central office. The method includes presetting a threshold value; capturing connection parameters of the xDSL modem and the central office, and computing a judging value; comparing the threshold value and the judging value to determine connection status between the xDSL modem and the central office; if the connection status is unstable, determining whether a noise type is impulse noise or continuous noise; and if the noise type is impulse noise, adjusting the preset threshold value to stabilize connection between the xDSL modem and the CO.

Other advantages and novel features will become more apparent from the following detailed description when taken in conjunction with the accompanying drawings, in which:

DETAILED DESCRIPTION OF THE INVENTION

Figure 1:
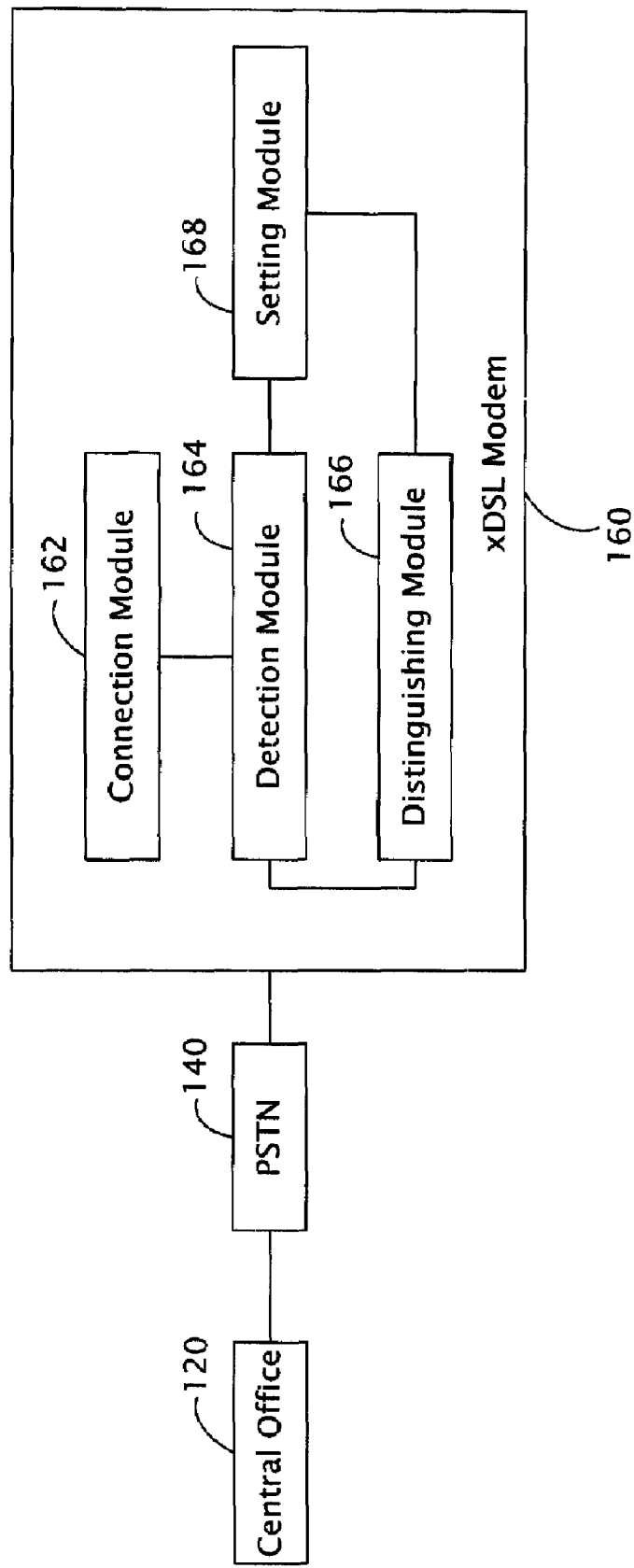
FIG. 1 shows an exemplary embodiment of an xDSL modem in accordance with the present invention.

FIG. 1 shows an exemplary embodiment of an xDSL modem 160 of the present invention.

In this exemplary embodiment, the xDSL modem 160 is connected to a central office (CO) 120 via a public switched telephone network (PSTN) 140. The CO 120 is a digital subscriber line access multiplexer (DSLAM).

The xDSL modem 160 includes a connection module 162, a detection module 164, a distinguishing module 166, and a setting module 168.

The connection module 162 is used for connecting to the CO 120 via the PSTN 140.

The detection module 164 is used for detecting a distance between the xDSL modem 160 and the CO 120, and capturing connection parameters of the xDSL modem 160 and the CO 120, and computing a judging value. The connection parameters include time points of errors occurring during a cyclical redundancy check (CRC), time points of errors occurring during a header error check (HEC), and connection rates, and so on.

In this exemplary embodiment, the detection module 164 firstly detects at every time point, such as $t_1, t_2, \ldots t_n$, the errors occurring during the CRC or the HEC, then computes time intervals between those time points, namely $t_2-t_1, t_3-t_2, \ldots t_n-t_{n-1}$. After computing the time intervals, the detecting module 164 computes the average value, represented by m, and the standard error, represented by $\sigma$, of the time intervals. The judging value is substantially equal to a sum of the average values (m) of the time intervals and the standard errors ($\sigma$) thereof.

The setting module 168 is used for pre-setting a threshold value, and adjusting the threshold value according to noise types. The threshold value is a standard for determining whether the connection status meets a user requirement.

The detection module 164 further compares the judging value and the threshold value to determine the connection status. Namely, the detection module 164 judges whether the judging value is greater than the threshold value. In this exemplary embodiment, the threshold value is defined as 40 seconds. If the judging value is greater than 40 seconds, the connection status is assumed to be unstable, and if vice versa, the connection status is stable.

The distinguishing module 166 is used for distinguishing noise types according to the judging value, and determining whether the connection is maintained or disconnected. If the judging value is greater than the threshold value, the distinguishing module 166 should distinguish the noise types according to the threshold value. The noise types include a continuous noise and an impulse noise.

In this exemplary embodiment, after a period of time, such as a time substantially equal to the judging value, from the time point $t_n$, the distinguishing module 166 determines the noise types according to whether an error has occurred again during the CRC or the HEC. After the period of time, if the error has occurred during the CRC or the HEC, the noise type is a continuous noise; if the error has not occurred during the CRC or the HEC, the noise type may be an impulse noise.

If the distinguishing module 166 determines the noise type is an impulse noise, the setting module 168 adjusts the threshold value to be greater than the judging value, and maintains the connection between the central office 120 and the xDSL modem 160; If the distinguishing module 166 determines the noise type is a continuous noise, the setting module 168 disconnects the connection between the central office 120 and the xDSL modem 160.

Figure 2:
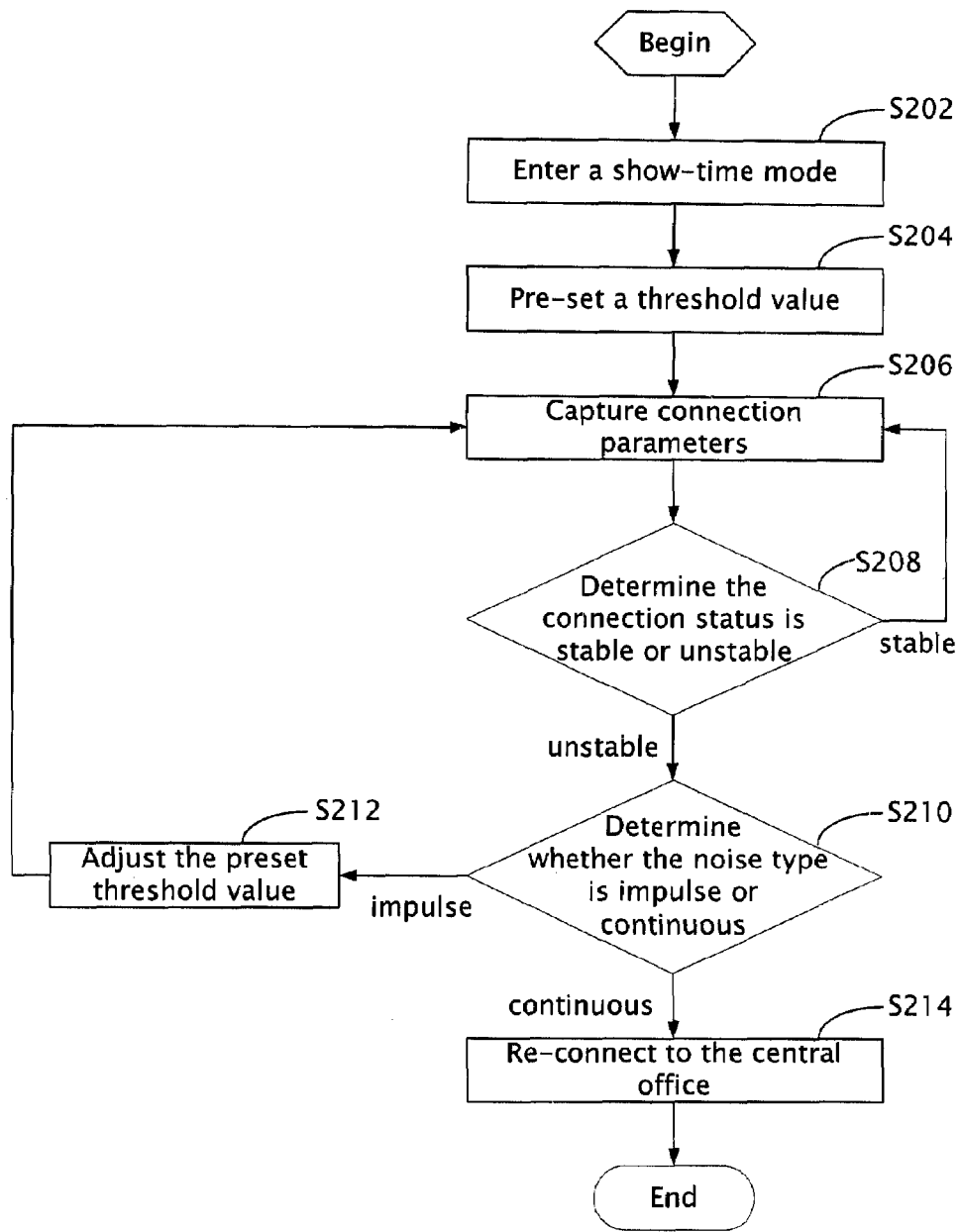
FIG. 2 shows a flowchart of stabilizing a connection between the central office and the xDSL modem of FIG. 1.

FIG. 2 shows a flowchart of stabilizing a connection between the central office 120 and the xDSL modem 160.

In step S202, the xDSL modem 160 and the central office 120 enter a show-time mode via the connection module 162.

In this exemplary embodiment, the connection module 162 detects the central office 120 by handshake protocol for determining whether the central office 120 is ready for communication. After the central office 120 is ready for communication, the connection module 162 detects the distance between the xDSL modem 160 and the central office 120 by performing transceiver training. After performing the transceiver training, a connection between the central office 120 and the xDSL modem 160 is setup. Then the connection module 162 analyzes the channels and exchange messages for determining the data traffic between the xDSL modem 160 and the central office 120. After the data traffic is successfully determined, the xDSL modem 160 and the central office 120 enter the show-time mode.

In step S204, the setting module 168 presets a threshold value for determining the connection status. In this exemplary embodiment, the threshold value is set to 40 seconds.

In step S206, the detection module 164 captures connection parameters of the xDSL modem 160 and the central office 120, and computes a judging value according to the connection parameters.

In this exemplary embodiment, the detection module 164 firstly detects at every time point, such as $t_1, t_2, \ldots t_n$, the errors occurring during the CRC or the HEC, then computes time intervals between those time points, namely $t_2-t_1$, $t_3-t_2, \ldots t_n-t_{n-1}$. After computing the time intervals, the detecting module 164 computes the average value, represented by m, and the standard error, represented by σ, of the time intervals. The judging value is substantially equal to a sum of the average value (m) of the time intervals and the standard error (σ) thereof.

In step S208, the detection module 164 compares the threshold value and the judging value to determine the connection status between the xDSL modem 160 and the central office 120.

In this exemplary embodiment, the threshold value is 40 seconds. Therefore, the detection module 164 determines whether the judging value is greater than 40 seconds. If the judging value is greater than 40 seconds, that indicates the connection status is unstable, contrariwise, the connection status is stable. If the connection status is stable, the process returns to step S206; if the connection status is unstable, the process proceeds to step S210.

In step S210, the distinguishing module 166 determines whether the noise type is impulse noise or continuous noise. If the noise type is impulse noise, the process proceeds to step S212; if the noise type is continuous noise the process proceeds to step S214.

In this exemplary embodiment, after a period of time, such as a time substantially equal to the judging value, from the time point $t_n$, the distinguishing module 166 determines the noise types according to whether an error has occurred again during the CRC or the HEC. After the period of time, if the error has occurred during the CRC or the HEC, the noise type is a continuous noise; if the error has not occurred during the CRC or the HEC, the noise type may be an impulse noise.

In step S212, the setting module 168 adjusts the preset threshold value to stabilize the connection between the xDSL modem 160 and the central office 120. Then the process returns to step S206.

For example, if the preset threshold value is 40 seconds, and the judging value computed by the detection module 164 is 100 seconds, then the judging value is greater than the threshold value. The distinguishing module 166 cannot exactly distinguish the noise type according to the threshold value, so the setting module 168 changes the threshold value into a greater value, such as 110 seconds, to exactly distinguish the noise type in step S208, according to the threshold value.

In step S214, when the noise type is a continuous noise, the connection module 162 re-connects to the central office 120.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. An xDSL (Digital Subscriber Line) modem, connected to a central office (CO) via a public network, comprising:
    a setting module for pre-setting a threshold value, and adjusting the threshold value according to noise types;
    a detection module for capturing connection parameters of the xDSL modem and the central office to compute a judging value, and comparing the judging value and the threshold value to determine connection status, wherein the connection parameters comprise time points of errors occurring during a cyclical redundancy check (CRC); and
    a distinguishing module for distinguishing noise types according to the judging value, and determining whether the connection is maintained or disconnected.

2. The xDSL modem as claimed in claim 1, wherein the judging value is substantially equal to a sum of an average value of time intervals between those time points and a standard error thereof.

3. The xDSL modem as claimed in claim 1, wherein the connection parameters comprise time points of errors occurring during a header error check (HEC).

4. The xDSL modem as claimed in claim 3, wherein the judging value is substantially equal to a sum of an average value of time intervals between those time points and a standard error thereof.

5. The xDSL modem as claimed in claim 1, wherein the detection module further judges whether the judging value is greater than the threshold value.

6. The xDSL modem as claimed in claim 1, wherein after a period of time substantially equal to the judging value from a time point, the distinguishing module further determines the noise types according to whether an error has occurred again.

7. The xDSL modem as claimed in claim 1, wherein the noise types comprise a continuous noise and an impulse noise.

8. The xDSL modem as claimed in claim 7, wherein if the distinguishing module determines the noise type is the impulse noise the setting module further adjusts the threshold value to be greater than the judging value.

9. The xDSL modem as claimed in claim 1, further comprising a connection module for connecting to the CO via the public network.

10. A method for stabilizing connection between an xDSL modem and a central office (CO), comprising:
   presetting a threshold value;
   capturing connection parameters of the xDSL modem and the central office to compute a judging value, wherein the connection parameters comprise time intervals between errors that occurred during a cyclical redundancy check (CRC); and
   comparing the threshold value and the judging value to determine connection status between the xDSL modem and the central office;
   wherein if the connection status is unstable, determining whether a noise type is impulse noise or continuous noise; and
   if the noise type is impulse noise, adjusting the preset threshold value to stabilize connection between the xDSL modem and the CO.

11. The method as claimed in claim 10, wherein the computing step further comprises computing the judging value according to the time intervals between errors that occurred during a cyclical redundancy check (CRC).

12. The method as claimed in claim 10, wherein the connection parameters comprise time intervals between errors that occurred during a header error check (HEC).

13. The method as claimed in claim 12, wherein the computing step further comprises computing the judging value according to the time intervals between errors that occurred during a header error check (HEC).

14. The method as claimed in claim 10, wherein the step of determining whether a noise type is impulse noise or continuous noise comprises determining the noise type according to the judging value.

15. The method as claimed in claim 10, further comprising re-connecting to the CO if the noise type is continuous noise.

16. A method for managing Digital Subscriber Line (DSL) connection between an xDSL modem and a central office (CO), comprising:
   establishing a DSL connection between an xDSL modem and a CO;
   presetting a threshold value;
   verifying a connection status of said DSL connection based on said threshold value;
   determining a noise type when said connection status is verified as unstable due to noise within said DSL connection;
   adjusting said threshold value to maintain said DSL connection when said noise type is determined as impulse noise, and
   re-establishing said DSL connection when said noise type is determined as continuous noise.

* * * * *